(12) United States Patent
Di Sabatino

(10) Patent No.: US 8,066,040 B2
(45) Date of Patent: Nov. 29, 2011

(54) HIGH ACCUMULATION TREE FELLING HEAD

(75) Inventor: Benjamin Di Sabatino, Brantford (CA)

(73) Assignee: Deere & Company, Moline, IL (US)

( * ) Notice: Subject to any disclaimer, the term of this patent is extended or adjusted under 35 U.S.C. 154(b) by 128 days.

(21) Appl. No.: 12/262,610

(22) Filed: Oct. 31, 2008

(65) Prior Publication Data

US 2010/0101684 A1    Apr. 29, 2010

Related U.S. Application Data

(60) Provisional application No. 61/108,343, filed on Oct. 24, 2008.

(51) Int. Cl.
*A01G 23/08* (2006.01)
(52) U.S. Cl. .................. 144/34.1; 144/4.1
(58) Field of Classification Search .......... 144/4.1, 144/34.1, 34.5
See application file for complete search history.

(56) References Cited

U.S. PATENT DOCUMENTS

| | | | | |
|---|---|---|---|---|
| 3,910,326 A | * | 10/1975 | Tucek | 144/34.5 |
| 3,911,981 A | * | 10/1975 | Tucek | 144/34.5 |
| 4,153,087 A | * | 5/1979 | Stoychoff | 294/106 |
| 5,697,412 A | * | 12/1997 | Kurelek | 144/34.5 |
| 5,794,674 A | | 8/1998 | Kurelek | |
| 5,931,210 A | | 8/1999 | Kurelek | |
| 6,152,201 A | | 11/2000 | Kurelek | |
| 6,363,980 B1 | | 4/2002 | Kurelek | |
| 7,174,932 B2 | * | 2/2007 | Mauchlen | 144/34.1 |
| 7,237,584 B2 | * | 7/2007 | DiSabatino | 144/4.1 |
| 2008/0099102 A1 | | 5/2008 | Trom | |

FOREIGN PATENT DOCUMENTS

| | | |
|---|---|---|
| CA | 1065742 | 4/1977 |
| CA | 1103130 | 9/1978 |

OTHER PUBLICATIONS

Prentice SH-56 High Capacity Bunching Saw; Blount, Inc., 1 page.
Prentice SH-50 High Capacity Bunching Saw; Blount, Inc.., 1 page.
Prentice SS-56 Side Cut Saw; Blount, Inc., 1 page.
Waratah FD118; 18-in (46 cm) Drive-To-Tree Felling Head; Waratah Forestry Attachments, 2 pages.
Waratah FD122; 22-in (56 cm) Drive-To-Tree Felling Head; Waratah Forestry Attachments, 2 pages.
Tigercat Felling Attachment; 6 pgs., Tigercat, Applicant Admitted Prior Art, known prior to Oct. 24, 2008.
Quadco; 206/227 Bunching Saws Preliminary Specifications, 1 page, Quadro Equipment, Applicant Admitted Prior Art, known prior to Oct. 24, 2008.
Quadco; Shear Single and Dual Post; Quadco Equipment Inc.; 2 pgs., Quadro Equipment, Applicant Admitted PriorArt, known prior to Oct. 24, 2008.
Deere and Company; 4 colorphot sarl enineering drawing; fs20; 5 pgs, Applicant Admitted Prior Art, known prior to Oct. 24, 2008.
Deere and Company; 2 color photos; fd45; 2 pgs, Applicant Admitted Prior Art, known prior to Oct. 24, 2008.

* cited by examiner

*Primary Examiner* — Shelley Self
(74) *Attorney, Agent, or Firm* — Baker & Daniels LLP

(57) ABSTRACT

A feller buncher is provided including a felling head having a gathering arm and an accumulation arm.

20 Claims, 1 Drawing Sheet

HIGH ACCUMULATION TREE FELLING HEAD

RELATED APPLICATIONS

This application claims priority to U.S. Provisional Patent Application Ser. No. 61/108,343, filed Oct. 24, 2008, titled "High Accumulation Tree Felling Head," the entire disclosure of which is expressly incorporated by reference herein.

FIELD OF THE INVENTION

The present invention relates to forestry equipment and, more particularly, to tree feller bunchers.

BACKGROUND AND SUMMARY OF THE INVENTION

Operators use tree feller bunchers to harvest trees. A typical tree feller buncher first cuts the tree and then places them in bunches on the ground for further processing with other machines such as skidders or forwarders. Some tree feller bunchers include felling head with a cutting device for cutting the tree and an accumulation pocket for receiving and holding one or more felled trees until the felled trees are place in bunches on the ground.

According to a first aspect of the present invention, a tree feller buncher is provided that is configured to fell and bunch trees. The tree feller buncher includes a chassis having a longitudinal axis; propulsion devices supporting the chassis to propel the chassis over the ground; an engine operatively coupled to the propulsion devices to power propulsion of the chassis; and a felling head. The felling head includes a support frame, a tree cutting tool assembly coupled to the support frame, a gathering arm coupled to the support frame, and an accumulation arm coupled to the support frame. The support frame includes an accumulation pocket sized to receive felled trees. The tree cutting tool assembly includes a housing and a cutting tool positioned at least partially within the housing. The housing has a first lateral side and a second lateral side laterally spaced-apart from the first lateral side. The accumulation pocket is laterally offset toward the second lateral side. The gathering arm is positioned to sweep a felled tree into the accumulation pocket. The accumulation arm includes an inner arm coupled to the support frame, an outer arm coupled to the inner arm, and an actuator, rotating the inner arm relative to the frame, and the outer arm relative to the inner arm to pull felled trees into the accumulation pocket. The inner arm of the accumulation arm is laterally positioned between the accumulation pocket and the first lateral side of the housing.

According to another aspect of the present invention, a tree feller buncher is provided that includes a chassis having a longitudinal axis; propulsion devices supporting the chassis to propel the chassis over the ground; an engine operatively coupled to the propulsion devices to power propulsion of the chassis; and a felling head. The felling head includes a support frame, a tree cutting tool assembly coupled to the support frame, a gathering arm coupled to the support frame, and an accumulation arm coupled to the support frame. The support frame includes an accumulation pocket sized to receive felled trees. The tree cutting tool assembly includes a housing and a cutting tool positioned at least partially within the housing. The housing has a first lateral side and a second lateral side being laterally spaced-apart from the first lateral side. The gathering arm is positioned to sweep a felled tree into the accumulation pocket. The accumulation arm includes an inner arm coupled to the support frame, an outer arm coupled to the inner arm, and an actuator moving the outer arm relative to the inner arm to pull felled trees laterally inward toward the longitudinal axis.

According to another aspect of the present invention, a tree feller buncher is provided that includes a chassis having a longitudinal axis; propulsion devices supporting the chassis to propel the chassis over the ground; an engine operatively coupled to the propulsion devices to power propulsion of the chassis; and a felling head. The felling head includes a support frame, a tree cutting tool assembly coupled to the support frame, a gathering arm coupled to the support frame, and an accumulation arm coupled to the support frame. The support frame includes an accumulation pocket sized to receive felled trees. The tree cutting tool assembly including a housing and a cutting tool positioned at least partially within the housing. The gathering arm rotates in a first direction relative to the support frame about a first axis of rotation to move felled trees into the accumulation pocket. The accumulation arm rotates in the first direction relative to the support frame about a second axis of rotation that is offset from the first axis of rotation.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
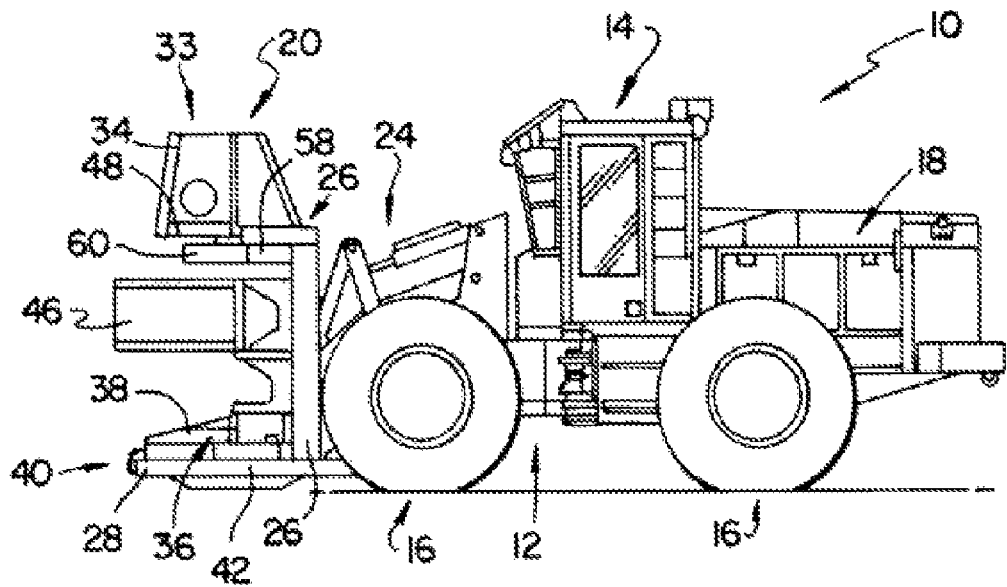
FIG. 1 is a side elevational view of a tree feller buncher showing the tree feller buncher including a chassis, a plurality of wheels, an operator cab, and a felling head.

Referring to FIG. 1, a wheeled tree feller buncher 10 of the present embodiment illustratively includes a chassis 12 having a cab portion 14, a plurality of wheels 16 for supporting chassis 12 above the ground, an engine 18 for powering wheels 16 to propel chassis 12, and a felling head 20 for harvesting trees 22. Feller buncher 10 also includes a linkage assembly 24 that allows felling head 20 to be raised, lowered, and tilted to position felling head 20 at a desired position relative to a tree 22 to be felled. Although a wheeled feller buncher is shown and described herein using wheels 16 as propulsion devices, felling head 20 may be provided on other types of tree feller bunchers, such as tracked tree feller bunchers that use tracks as propulsion devices. Additional details of a feller buncher are provided in U.S. Pat. No. 5,697,412, the entire disclosure of which is expressly incorporated by reference herein.

Felling head 20 includes a support frame 26 supported by linkage assembly 24. Felling head 20 includes saw housing extensions 28, 30 and an accumulation pocket 32 into which felled trees are directed for short-term storage while additional trees 22 are felled. An upper portion 33 of accumulation pocket 32 is defined by a horn 34 and a lower portion 36 of accumulation pocket 32 is defined by plates 38. Saw housing extensions 28, 30 generally assist in aligning head 20 with a tree 22 to be felled.

Frame 26 supports tree cutting tool assembly 40 that is used to cut a tree trunk from its roots. According to the exemplary embodiment of the present disclosure, tree cutting tool assembly 40 includes a saw housing 42 and a circular saw blade 44 that rotates about an axis of rotation 45. Saw blade 44 includes a plurality of replaceable teeth (not shown) that cut the tree 22 as head 20 is advanced into the tree 22. The majority of blade 44 is covered by saw housing 42, but a portion positioned between saw housing extensions 28, 30 is exposed to cut the trees 22. According to alternative embodiments, tree cutting tools other than saw blades are provided, such as shear blades shown in U.S. Pat. No. 5,697,412, the entire disclosure of which is expressly incorporated by reference herein.

Frame 26 also pivotably supports a gathering arm 46 and an accumulation arm 48 that gather and hold felled trees 22 in accumulation pocket 32. As shown in FIG. 1, gathering arm 46 is positioned below and is designed to guide cut trees into the accumulating pocket, while accumulation arm 48 is designed to hold the accumulated trees in the pocket. Additional details of an alternative gathering arm are provided in U.S. Pat. No. 5,697,412, the entire disclosure of which is expressly incorporated by reference herein. According to the preferred embodiment, frame 26 includes two laterally offset posts. According to other embodiments, a single post may be provided.

During felling and accumulating of trees 22, head 20 cuts a tree 22. After tree 22 is cut, gathering arm 46 rotates about an axis of rotation 50 in direction 52 from a fully open position 46' (shown in FIG. 2) to a closed position. During this movement, a first-to-be-felled tree 22' is pushed into a deep portion 54 of pocket 32. A hydraulic or other actuator (not shown) coupled to gathering arm 46 rotates gathering arm 46 about axis of rotation 50 in direction 52 and in opposite direction 56.

Figure 2:
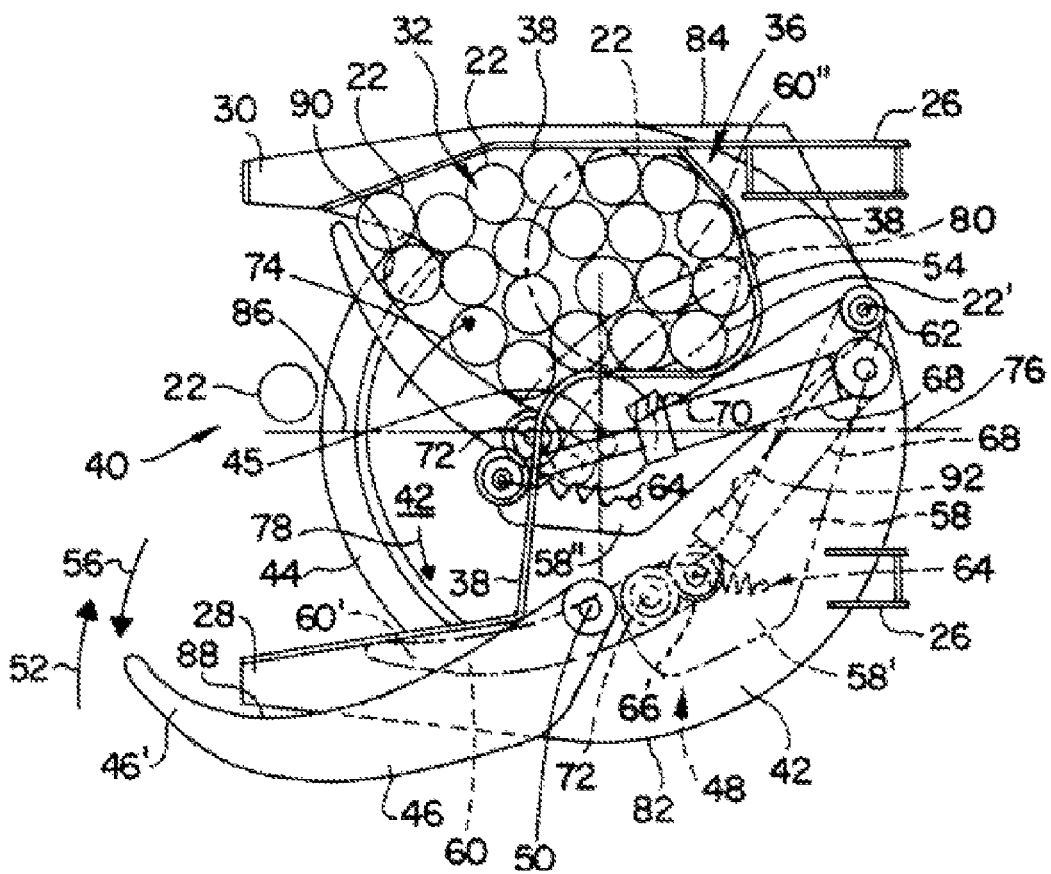
FIG. 2 is a top plan view of the felling head showing the felling head including a support frame defining an accumulation pocket, a cutting tool assembly for cutting a tree, a gathering arm for moving a felled tree into the accumulation pocket after being cut, and an accumulation arm having inner and outer arms for holding felled trees in the accumulation pocket.

Accumulation arm 48 includes an inner arm 58 pivotably coupled to frame 26 and an outer arm 60 pivotably coupled to inner arm 58. Several positions of accumulation arm 48 are shown in FIG. 2. Initially, inner arm 58 of accumulation arm 48 rotates about an axis of rotation 62 from an open position (shown as a counterclockwise-most position 58' in FIG. 2) to a closed position (shown as clockwise-most position 58" in FIG. 2). A spring 64 (shown diagrammatically in FIG. 2) extends from inner arm 58 to a first extension 66 of outer arm 60. Spring 64 urges outer arm 60 to a fully-extended position relative to inner arm 58 (shown in FIG. 2 as position 60'). According to alternative embodiments, axis of rotation 62 is provided in other locations, such as on the opposite side of longitudinal axis 76, and/or forward or rearward of the position shown in FIG. 2.

A hydraulic actuator 68 extends from frame 26 to first extension 66 of outer arm 60. Extension of actuator 68 causes inner arm 58 to rotate from the open position 58' to the closed position 58". During movement of inner arm 58 between the open position 58' and the closed position 58", spring 64 urges outer arm 60 to the fully-extended position 60'. At the end of its travel, inner arm 58 hits a stop 70 so that inner arm 58 stops rotating. Stops may be provided in other locations.

After inner arm 58 stop rotating because of hitting the stop 70 (or otherwise), actuator 68 continues to extend. As actuator 68 continues extending, outer arm 60 begins rotating relative to inner arm 58 about axis of rotation 72 in direction 74 from the fully extended position 60' toward a fully-retracted position 60". Rotation of outer arm 60 about axis 72 pulls tree 22 laterally inward toward a longitudinal axis 76 of chassis 12.

After accumulation arm 48 secures tree 22 in pocket 32, gathering arm 46 rotates back to the open position 46'. Another tree 22 is then cut by saw blade 44 and gathering arm 46 pushes the felled tree 22 into pocket 32 behind outer arm 60 of accumulation arm 48 so that the second felled tree 22 is positioned between outer arm 60 and gathering arm 46. Next, actuator 68 retracts. As actuator 68 retracts, outer arm 60 encounters resistance from the second felled tree 22. As a result, inner arm 58 rotates about axis 62 in direction 78. During this movement, a distal tip 80 of outer arm 60 slides past the second felled tree 22 and gathering arm 46 pushes the second felled tree 22 deeper into pocket 32. After outer arm 60 clears the second felled tree 22, actuator 68 rotates outer arm 60 in direction 74. Once secured by accumulation arm 48, gathering arm 46 rotates back to the open position 46'. The above process continues until pocket 32 is full of felled trees 22 and feller buncher 10 unloads the accumulated trees 22 on the ground.

As shown in FIG. 2, saw housing 42 includes a first lateral side 82 and a second lateral side 84 positioned opposite longitudinal axis 76 from first lateral side 82. Inner arm 58 of accumulation arm 48 is positioned inward of accumulation pocket 32 so that accumulation pocket 32 is positioned between second lateral side 84 of saw housing 42 and inner arm 58. Axis of rotation 62 of inner arm 58 of accumulation arm 48 is positioned on a first or right side of longitudinal axis 76 and axis of rotation 50 of gathering arm 46 is positioned on a second or left side of longitudinal axis so that axis of rotation 62 is positioned on one side of a vertical plane 86 extending through longitudinal axis 76 and axis of rotation 50 is positioned on an opposite side of vertical plane 86. Axis of rotation 62 of inner arm 58 of accumulation arm 48 is positioned rearward of axis of rotation 45 of saw blade 44 and axis of rotation 50 of gathering arm 46 is positioned slightly forward of axis of rotation 45 of saw blade 44. As shown in FIG. 2, gathering arm 46 and outer arm 60 of accumulation arm 48 have respective concave surfaces 88, 90 that assist in collecting felled trees 22 in pocket 32. When outer arm 60 is in the fully-retracted position 60", concave surface 90 of outer arm 60 is facing inward. Inner arm 58 of accumulation arm 48 also includes a concave surface 92 that provides clearance. When outer arm 60 is in the fully-retracted position 60", concave surface 90 of outer arm 60 faces concave surface 92 of inner arm 58. According to alternative embodiments, surfaces 88, 90 are straight.

Although the invention has been described in detail with reference to certain preferred embodiments, variations and modifications exist within the spirit and scope of the invention as described and defined in the following claims.

The invention claimed is:

1. A tree feller buncher configured to fell and transport trees including:
   a chassis having a longitudinal axis;
   propulsion devices supporting the chassis to propel the chassis over the ground;
   an engine operatively coupled to the propulsion devices to power propulsion of the chassis; and
   a felling head including a support frame, a tree cutting tool assembly coupled to the support frame, a gathering arm coupled to the support frame, and an accumulation arm coupled to the support frame,
      the support frame including an accumulation pocket sized to receive felled trees,
      the tree cutting tool assembly including a housing and a cutting tool positioned at least partially within the housing, the housing having a first lateral side and a second lateral side being laterally spaced-apart from the first lateral side, the accumulation pocket being laterally offset toward the second lateral side, the gathering arm being positioned to sweep a felled tree into the accumulation pocket, the accumulation arm including an inner arm coupled to the support frame, an outer arm coupled to the inner arm, and an actuator, the actuator rotating the inner arm relative to the frame and the outer arm relative to the inner arm when the accumulation arm moves toward the accumulation pocket to pull felled trees into the accumulation pocket, the inner arm of the accumulation arm being laterally positioned between the accumulation pocket and the first lateral side of the housing.

2. The tree feller buncher of claim 1, wherein the gathering arm rotates relative to the support frame in a first direction while urging felled trees in the accumulation pocket and the accumulation arm rotates in the first direction while pulling felled trees into the accumulation pocket.

3. The tree feller buncher of claim 1, wherein the gathering arm rotates about a first axis of rotation and the accumulation arm rotates about a second axis of rotation that is offset from the first axis of rotation.

4. The tree feller buncher of claim 3, further comprising a vertical plane passing through the longitudinal axis, the first axis of rotation and the second axis of rotation are positioned on opposite sides of the vertical plane.

5. The tree feller buncher of claim 4, wherein the cutting tool is a saw blade that rotates about an axis of rotation, wherein the first axis of rotation is positioned forward of the axis of rotation of the saw blade and the second axis of rotation is positioned rearward of the axis of rotation of the saw blade.

6. The tree feller buncher of claim 1, wherein the accumulation arm follows a path during movement, the path having a first end and a second end, the entirety of the accumulation arm remains laterally within the first and second lateral sides of the housing of the tree cutting tool assembly during movement from the first end of the path to the second end of the path.

7. The tree feller buncher of claim 1, wherein the outer arm includes a distal tip and the inner arm rotates about an axis of rotation relative to the housing, the distal tip of the outer arm rotates relative to the inner arm from a location laterally between the first lateral side of the housing of the cutting tool assembly and the axis of rotation of the inner arm and a location laterally between the second lateral side of the housing and the axis of rotation of the inner arm.

8. The tree feller buncher of claim 1, wherein the actuator extends from the housing, projects beyond the inner arm toward the outer arm, and extends to the outer arm.

9. A tree feller buncher configured to fell and transport trees including:
a chassis having a longitudinal axis;
propulsion devices supporting the chassis to propel the chassis over the ground;
an engine operatively coupled to the propulsion devices to power propulsion of the chassis; and
a felling head including a support frame, a tree cutting tool assembly coupled to the support frame, a gathering arm coupled to the support frame, and an accumulation arm coupled to the support frame,
the support frame including an accumulation pocket sized to receive felled trees,
the tree cutting tool assembly including a housing and a cutting tool positioned at least partially within the housing, the housing having a first lateral side and a second lateral side being laterally spaced-apart from the first lateral side,
the gathering arm being positioned to sweep a felled tree into the accumulation pocket,
the accumulation arm moveable between an open position to expose the accumulation pocket and a closed position to pull felled trees into the accumulation pocket, the accumulation arm moving in a first direction from the open position to the closed position and in a second direction opposite the first direction from the closed position to the open position, the accumulation arm including
an inner arm coupled to the support frame,
an outer arm coupled to the inner arm, and
an actuator moving the outer arm relative to the inner arm when the accumulation arm moves in the first direction to pull felled trees laterally inward toward the longitudinal axis.

10. The tree feller buncher of claim 9, wherein the outer arm includes a distal tip and the inner arm rotates about an axis of rotation relative to the housing, the distal tip of the outer arm rotates relative to the inner arm from a location laterally between the first lateral side of the housing of the cutting tool assembly and the axis of rotation of the inner arm and a location laterally between the second lateral side of the housing and the axis of rotation of the inner arm.

11. The tree feller buncher of claim 9, wherein the cutting tool is a saw blade that rotates about an axis of rotation, wherein at least a portion of the inner arm is laterally positioned between the axis of rotation of the saw blade and the first lateral side of the housing of the tree cutting tool assembly and at least a portion of the outer arm is laterally positioned between the axis of rotation of the saw blade and the second lateral side of the housing.

12. The tree feller buncher of claim 9, wherein the cutting tool is a saw blade that rotates about a first axis of rotation and the gathering arm rotates about a second axis of rotation that is forward of the first axis of rotation, the first axis of rotation of the saw blade being located closer to the chassis in a direction parallel to the longitudinal axis than the second axis of rotation of the gathering arm.

13. The tree feller buncher of claim 12, wherein the accumulation arm rotates about a third axis of rotation that is positioned rearward of the first axis of rotation, the third axis of rotation of the accumulation arm being located closer to the chassis in the direction parallel to the longitudinal axis than both the first axis of rotation of the saw blade and the second axis of rotation of the gathering arm.

14. The tree feller buncher of claim 9, wherein the outer arm moves between a fully-extended position and a fully-retracted position, the outer arm has a concave surface that pulls the felled trees, and the concave surface faces inward and toward the chassis when the outer arm is in the fully-retracted position.

15. The tree feller buncher of claim 14, wherein the inner arm has a concave surface that faces the concave surface of the outer arm when the outer arm is in the fully-retracted position.

16. A tree feller buncher configured to fell and transport trees including:
a chassis having a longitudinal axis, a vertical plane passing through the longitudinal axis;
propulsion devices supporting the chassis to propel the chassis over the ground;
an engine operatively coupled to the propulsion devices to power propulsion of the chassis; and a felling head including a support frame, a tree cutting tool assembly coupled to the support frame, a gathering arm coupled to the support frame, and an accumulation arm coupled to the support frame,
the support frame including an accumulation pocket sized to receive felled trees,
the tree cutting tool assembly including a housing and a cutting tool positioned at least partially within the housing,
the gathering arm rotating in a first direction relative to the support frame about a first axis of rotation to pull felled trees into the accumulation pocket,
the accumulation arm rotating in the first direction relative to the support frame about a second axis of rotation that is offset from the first axis of rotation, wherein the first axis of rotation is positioned laterally from the vertical plane in a first direction and the second axis of rotation is positioned laterally from the vertical plane in a second direction that is opposite the first direction.

17. The tree feller buncher of claim 16, wherein the accumulation arm includes an inner arm coupled to the support frame, an outer arm coupled to the inner arm, and an actuator moving the outer arm relative to the inner arm to pull felled trees laterally inward toward the longitudinal axis.

18. The tree feller buncher of claim 17, wherein the outer arm moves between a fully-extended position and a fully-retracted position, the outer arm has a concave surface that pulls the felled trees, and the concave surface faces inward and toward the chassis when the outer arm is in the fully-retracted position.

19. The tree feller buncher of claim 18, wherein the inner arm has a concave surface that faces the concave surface of the outer arm when the outer arm is in the fully-retracted position.

20. The tree feller buncher of claim 1, wherein the actuator is directly coupled to the outer arm.

* * * * *